G. M. DENNIS.
COMBINATION CONDIMENT HOLDER AND CUTLERY UTENSIL.
APPLICATION FILED MAY 21, 1914.
1,155,802.　　　　　　　　　　　　　　Patented Oct. 5, 1915.
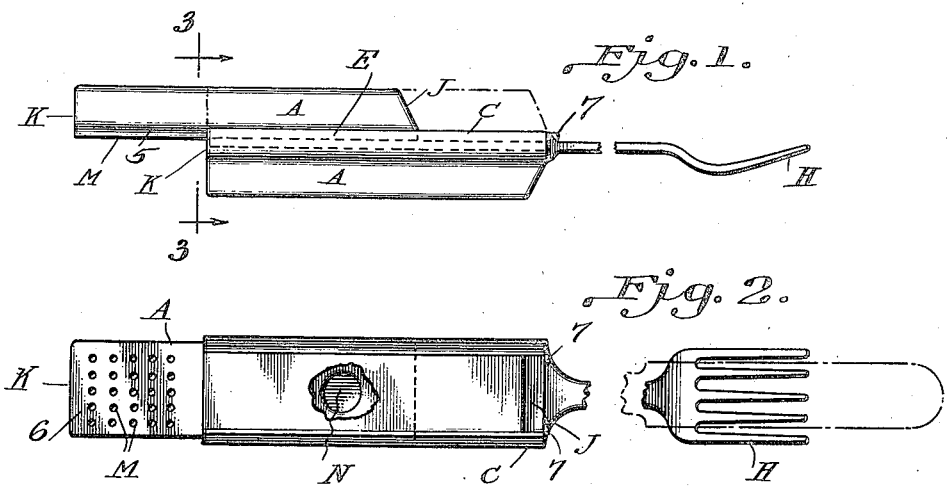
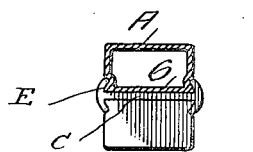
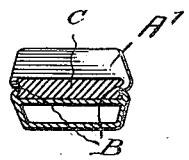
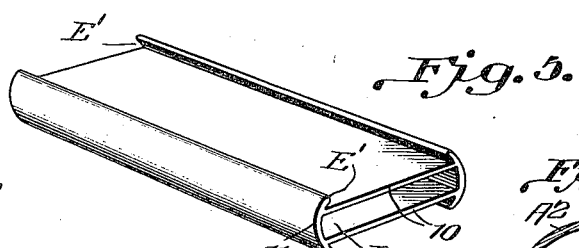
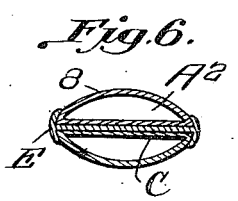
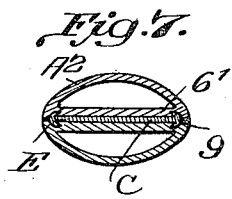
Witnesses:
F. C. Barry
Alan F. Garner
Inventor:
George M. Dennis
By Munn & Co.
Attorneys

UNITED STATES PATENT OFFICE.

GEORGE M. DENNIS, OF VAN HOUTEN, NEW MEXICO.

COMBINATION CONDIMENT-HOLDER AND CUTLERY UTENSIL.

1,155,802.  Specification of Letters Patent.  Patented Oct. 5, 1915.

Application filed May 21, 1914. Serial No. 839,990.

*To all whom it may concern:*

Be it known that I, GEORGE M. DENNIS, a citizen of the United States, and a resident of Van Houten, in the county of Colfax and State of New Mexico, have invented a new and useful Improvement in Combination Condiment-Holders and Cutlery Utensils, of which the following is a specification.

This invention relates to culinary articles, and more particularly to an improved combination condiment holder and cutlery article.

One of the principal objects of the invention is to provide a fork or knife, spoon or any other suitable and desirable article with a handle formed of a pair of condiment holders slidably positioned relatively to the article and capable of being partially removed therefrom whereby to allow seasoning of food by the condiment contained in the holders.

Another object of the invention is to provide the handle of a cutlery article with means whereby hollow condiment holders may be slidably positioned on the handle, capable of immediate use.

A further object of the invention is to provide an improved combination condiment holder and cutlery article which will be extremely simple, durable, efficient in operation and inexpensive to manufacture.

With these and other objects in view which will become apparent as the description proceeds, the invention resides in the construction, combination and arrangement of parts hereinafter more fully described and claimed, and illustrated in the accompanying drawing in which like characters of reference indicate like parts throughout the several figures, of which—

Figure 1 represents a side elevational view of the invention, one of the holders being partially removed to expose the openings through which the condiment may be shaken, Fig. 2 represents a top plan view thereof, portions being broken away, Fig. 3 represents a vertical transverse sectional view taken on the plane indicated by the line 3—3 of Fig. 1, Fig. 4 represents a view similar to Fig. 3 of a modified form, Fig. 5 represents a perspective view of a holder plate to be used with cutlery articles of ordinary construction, Fig. 6 represents a view similar to Fig. 3 of a further modified form, and Fig. 7 represents a view similar to Fig. 3 of another modification.

Referring more particularly to Figs. 1, 2 and 3 of the drawing, C represents the shank or handle of a fork or knife, or any other article with which it is desired to use the condiment holder, and the shank is provided at its edges with flanges E which project above and below the shank, and which are curved or inclined toward each other as shown, and the flanges are adapted to engage the grooves 5 formed longitudinally of the side walls of the condiment holders A near the lower edges of the side walls whereby the holders may be slipped one on each side of the shank into engagement with the flanges so as to maintain the holders on the shank in slidable relation thereto, said holders forming the handle of the cutlery article. The condiment holders may be beveled at their forward ends as at J, and they may be substantially rectangular in cross-section as shown in the first four figures, or they may be of a configuration indicated in Figs. 6 or 7, or of any other suitable and desirable formation. The bottom 6 of each holder near its rear end K, is provided with a plurality of perforations or openings M through which when either of the holders is drawn partially outward, as indicated in Figs. 1 and 2, the condiment contained in the holder may be sifted through the openings onto the food. Near their forward ends the bottoms are provided with openings indicated at N in Fig. 2, through which the condiment may be poured in filling the holders. The openings M and N are shown round, but it will of course be understood that their conformation is optional. When the holders are in position on the shank, the openings N will, of course, be closed by said shank as will also the openings M, except when the holders are drawn rearwardly far enough to expose the latter openings, as will be readily understood. The flanges E may extend as shown substantially the length of shank C, or may be shorter than the shank as found most desirable. The forward movement of the holders A may be limited by the lugs or stops 7 formed at the forward ends of flanges E, to maintain the rear ends K of the holders flush with the rear end of shank C.

In the form indicated in Fig. 4, shank C is provided with substantially V-shaped grooves extending along its longitudinal edges, and the holders A' are provided with depending flanges B extending toward each other and adapted to engage the grooves as indicated, whereby to maintain the condiment holders in position on the shank. The shanks C in Figs. 6 and 7, are formed with flanges E similar to Fig. 3, the holders A² being provided with curved walls 8 instead of straight walls. The holders are shaped in Fig. 6 so that the flanges E engage the opposite lateral edges of the holders in the manner shown. In Fig. 7, the bottoms 6' of the holders are provided near their outer edges with longitudinally disposed parallel grooves 9 slidably engaging the flanges E, the bottoms extending slightly on each side of the shank and resting against each other at their extreme outer edges as indicated.

The holders may be colored differently so as to enable the user to determine in which holder a certain condiment is contained, or they may be provided with distinguishing characters or marks; and if so desired the holders and flanges may be engraved or otherwise decorated to present an attractive appearance; and also to make the handle appear as a solid piece when the holders are in position, by obliterating the lines formed at the meeting edges of the holders and flanges.

The holder plate indicated in Fig. 5 comprises a pair of spaced plates 10, connected by the curved side plates 11 which form the flanges E' extending above and below the plates, and this holder is adapted to be slipped onto and suitably secured to the shanks or handles of culinary articles now in use, the flanges E' operating in the manner already described for maintaining the condiment holders in position. The holder plate is intended for use where the articles are not originally manufactured with the condiment holders, it being my intention both to manufacture cutlery articles with the condiment holders and to manufacture the plates so that the holders may be used with articles now in use.

Although I have described the preferred embodiment of my invention, I may desire to make such changes in the construction, combination and arrangement of parts as do not depart from the spirit of the invention and the scope of the appended claims.

I claim:

1. A device of the class described including a table implement shank having flanges formed on its edges and extending above and below the shank and disposed toward each other, hollow condiment holders provided with grooves in which said flanges are adapted to engage whereby the holders may be slidably maintained on the shank, each holder at one end having its bottom provided with sifter openings, and at the other end with a filler opening, said shank adapted to normally close said sifter and filler openings.

2. A device of the class described including a table implement shank, condiment holders, each of said holders providing a hollow body portion, the bottom of each holder being provided with an opening whereby the holder may be filled and with openings whereby a condiment may be sifted from the holder, and means for slidably maintaining said holders on opposite sides of the shank.

3. A device of the class described comprising a table implement shank, a hollow condiment holder, flanges carried by one of the parts, the other part being provided with grooves in which said flanges are adapted to engage to hold the parts in relative position.

4. A device of the class described comprising a table implement shank, hollow condiment holders adapted to be disposed one on each side thereof, coöperating means between said holders and shank whereby the former may be slidably maintained upon the latter, each of said holders being provided with openings through which condiment may be sifted, the holders being adapted to be moved into position upon the shank for closing the openings.

GEORGE M. DENNIS.

Witnesses:
C. Derickson,
W. M. Oliver.